United States Patent [19]

Whiteley

[11] 4,042,037

[45] Aug. 16, 1977

[54] LAWN EDGING DEVICE

[75] Inventor: William Bede Whiteley, Orange, Australia

[73] Assignee: Marie Ellen Whiteley, Orange, Australia

[21] Appl. No.: 635,485

[22] Filed: Nov. 25, 1975

[30] Foreign Application Priority Data

Dec. 3, 1974 Australia .............................. 1861/74
May 5, 1975 Australia .............................. 1483/75

[51] Int. Cl.² .......................... A01B 35/26; A01B 1/00
[52] U.S. Cl. ............................................. 172/13; 15/1;
15/93 R; 15/104.5; 15/236 R; 172/352; 172/378
[58] Field of Search .................... 172/352, 13, 17, 19,
172/20, 332, 351, 361, 371, 776, 378

[56] References Cited

U.S. PATENT DOCUMENTS 2,950,769  8/1960  Johnson ........................... 172/352 X
3,474,868  10/1969  Watson ............................ 172/352 X Primary Examiner—George J. Marlo
Attorney, Agent, or Firm—Ladas, Parry, Von Gehr, Goldsmith & Deschamps

[57] ABSTRACT

The present invention resides in a floor cleaning aid or lawn edging device comprising a shank having a handle portion at one end thereof, a blade member depending from another end of said shank remote from said handle, means projecting from said blade member in a direction transverse to the plane of the blade member and an elongate member pivotally connected at one end thereof to said shank to pivot in a plane substantially parallel to said plane of the blade. Further there is provided a spring connecting said elongate member and said blade member, said spring being adapted to bias said elongate member towards said blade member.

2 Claims, 4 Drawing Figures

U.S. Patent  Aug. 16, 1977  Sheet 1 of 2  4,042,037
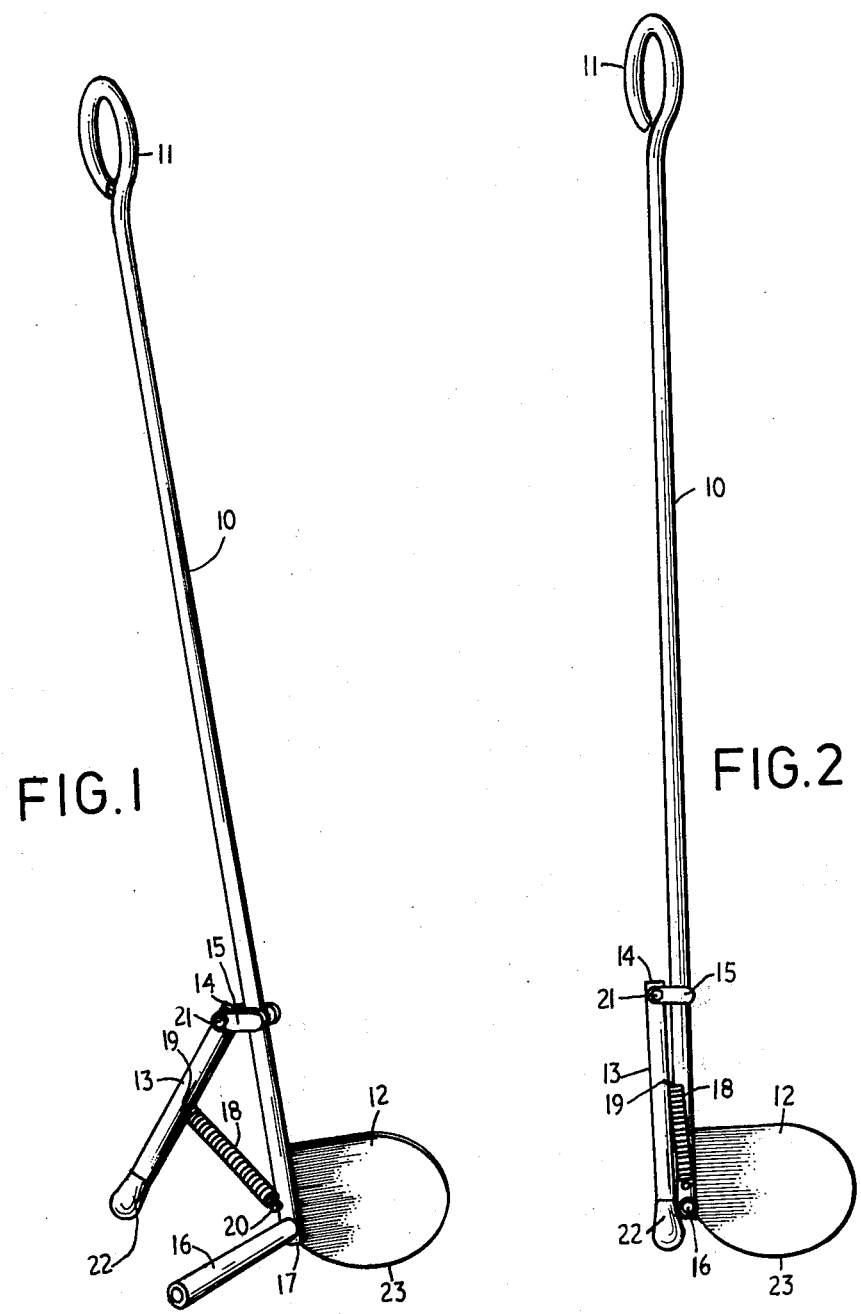

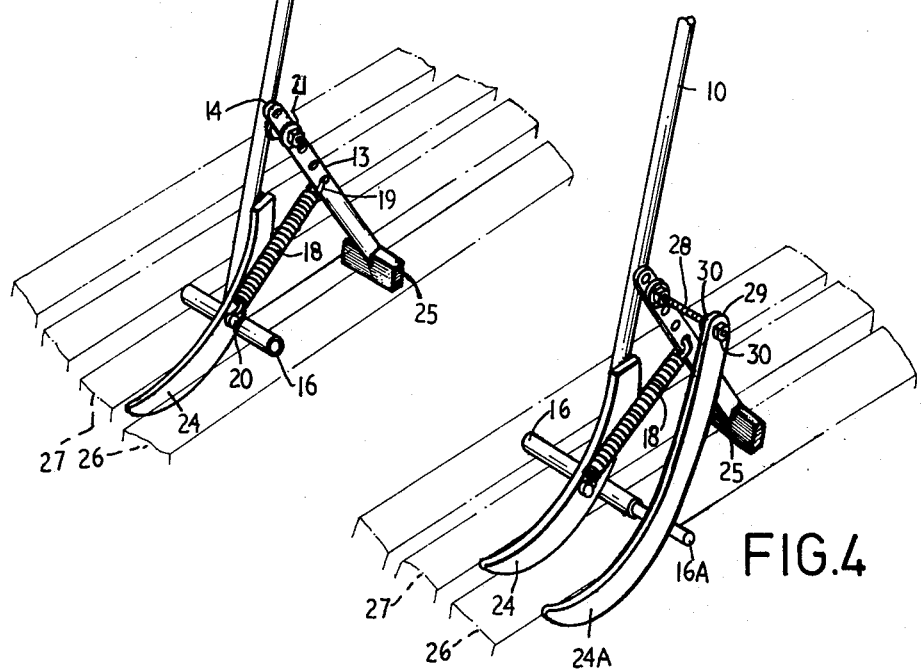

LAWN EDGING DEVICE

The present invention relates to mechanical devices and more particularly to a device which in one form may be used as an edge trimmer for lawns and which in another form may be used in the wool shed to remove manure and other deposits from between spaced floor members of a grating floor.

Both the trimming of lawn edges and the cleaning of grating floors are time consuming and laborious work. Accordingly it is an object of the present invention to provide a device of economic construction which is an aid in such work.

The present invention in one general form is an apparatus comprising a shank having a handle portion at one end thereof, a blade member depending from another end of said shank remote from said handle, means projecting from said blade member in a direction transverse to the plane of the blade member and an elongate member pivotally connected at one end thereof to said shank to pivot in a plane substantially parallel to said plane of the blade.

Preferably there is provided spring means connecting said elongate member and said blade member, said spring means being adapted to bias said elongate member towards said blade member.

A preferred embodiment of the present invention will now be described by way of example with reference to the accompanying drawings, in which:

FIG. 1 is a perspective view of a lawn edging device in accordance with the present invention;

FIG. 2 is a side elevation of the lawn edging device illustrated in FIG. 1 with a pivoted member biased in its forward position;

FIG. 3 is a perspective view of the device adapted for use in removing manure from between spaced floor members of a grating floor; and FIG. 4 is a perspective view of the device illustrated in FIG. 3 adapted to incorporate an additional blade.

FIG. 1 illustrates the lawn edging device in its extended form and FIG. 2 illustrates the device in its unextended form. It will be seen that the device in FIGS. 1 and 2 comprises a tubular shank 10 having a handle 11 at an upper end of the shank, a blade 12 secured to a lower end of the shank 10, an elongate tubular leg member 13 which is pivotally attached at end 14 thereof to a bracket 15 which in turn is secured by welding or any other suitable means to shank 10. A transverse pipe section 16 is welded at one end 17 thereof to the lower end of the shank 10. The pipe section 16 is aligned in a direction substantially normal to the plane of the blade 12. Further it will be noted that the pipe section 16 may be secured directly to the blade 12 if so required. The leg member 13 pivots substantially in the plane of the blade 12, but may be arranged to pivot in an adjacent parallel plane. A spring 18 is attached at one end 19 to the leg member 13 between its ends and at the other end 20 to the shank 10 adjacent the blade 12. In the absence of any other restraint the spring 18 causes leg 13 to rotate about pivot 21 towards that portion of the shank 10 adjacent the blade 12, as shown in FIG. 2. The lowermost end of the tubular leg member 13 is fitted with a closure and abutment member 22 of rubber, plastics or any other suitable material.

To illustrate the manner of operation of the lawn edging device, it is first convenient to describe the "walking" movements of the device. The device is first held upright and the closure member or end 22 of leg member 13 engaged with the lawn surface. The shank 10 may then be caused to rotate about pivot 21 by moving handle 11 down towards an operator standing behind the device and adjacent leg 13. At the same time shank 10 is moved forwards, end 22 of leg 13 remaining in contact with the lawn surface to cause blade 12 to move forward a "step" and stretch spring 18. On placing blade 12 in contact with the lawn surface and moving handle 11 away from the operator in a forward rocking movement, leg 13 is released and springs forward towards the blade for the next step.

The blade is sharpened on an underside edge 23 thereof. Accordingly the device may be caused to cut the lawn during the above mentioned forward rocking movement and the cutting operation may be assisted by placing a foot of the operator on the transverse pipe section 16, thereby effectively causing the blade to pivot about the tubular axis of section 16. The device of course may be used in any way convenient to the operator.

The device may be adapted for use in the wool shed where sheep manure and other deposits become lodged in the cracks between floor members of a grating floor, and must be cleaned. A suitable form of the device for such cleaning purposes is illustrated in FIG. 3. For convenience like numbered reference numerals in FIGS. 1 to 4 identify like numbered parts.

It will be seen in FIG. 3 that the blade 12 of the lawn edger of FIGS. 1 and 2 is replaced by an arcuate blade 24 and the transverse pipe section 16 extends from both sides of the blade 24. Further, closure member 22 of leg 13 is replaced by a transverse metal plate 25 which is welded to the lower end of leg 13.

It will be apparent that the device of FIG. 3 may be operated by first inserting the blade 24 into the space between adjacent floorboards 26 and 27 whilst firmly holding the handle 11. The transverse pipe section 16 extends across the space between the floorboards and initially rests with its ends on those boards. The handle 11 is then pushed forward whilst the transverse metal plate 25, which is affixed to the end of the pivoted leg 13, is placed in contact with the floor across the space between the floorboards in which the blade is inserted. As the handle and shank are pushed forward, the blade 24 is raised in the space, thus lifting from the space any deposits lodged therein. The spring 18 connecting the leg 13 and the blade 24 is stretched and is released after the blade has taken one scoop of droppings from the floor space concerned. When the spring is released, the operator's foot is placed on the transverse pipe section 16 beneath the blade to fix the pipe section 16 to the floor. The leg 13 thus pivots towards the blade 24, and is returned to the floor and the operation is repeated until the space between these two particular floorboards is cleaned.

In an alternative form of grating floor cleaning device, an additional blade or blades may be attached to the device, as shown in FIG. 4. The additional blade 24A is spaced from and substantially parallel to the first blade 24 and has secured thereto a transversely aligned rod 16A, which is positioned, sized and shaped to allow one end of the rod 16A to locate with a sliding fit in the internal bore of pipe section 16 of blade 24. Pivot 21 is provided with a threaded extension portion 28, to which an upper end 29 of blade 24A is attached and secured by nuts 30. By adjusting the position of the blade 24A on extension portion 28, the device may accommodate a range of widths of grating floor members 26 and 27.

It will be obvious to a man skilled in the art that one of the blade members may actually form the lowest region of the shank 10.

What I claim is:

1. A lawn edging device comprising an elongated shank having a handle portion disposed at one end thereof, a planar cutting member having a sharpened lowermost cutting edge, and an upright straight edge fixed to the other end of the shank so that said cutting member extends from the shank in only a first direction, a footrest bar extending from the lower end of the shank at right angles to said first direction, an elongate member pivotally connected at one end thereof to the opposite side of said shank from said cutting member, and spring means connecting said elongate member to a point adjacent said other end of said shank and normally biasing said elongate member towards said shank.

2. A device according to claim 1, wherein said elongate member is provided with a cap of hard material at the end remote from the pivotal connection.

* * * * *